United States Patent
Hegel

(10) Patent No.: US 10,654,237 B2
(45) Date of Patent: May 19, 2020

(54) SYSTEM AND METHOD FOR IDENTIFYING A COMPRESSION ROLLER COLUMN IN A TABLETING MACHINE

(71) Applicant: Korsch AG, Berlin (DE)

(72) Inventor: Walter Hegel, Berlin (DE)

(73) Assignee: Korsch AG, Berlin (DE)

( * ) Notice: Subject to any disclaimer, the term of this patent is extended or adjusted under 35 U.S.C. 154(b) by 0 days.

(21) Appl. No.: 15/467,976

(22) Filed: Mar. 23, 2017

(65) Prior Publication Data
US 2017/0190133 A1 Jul. 6, 2017

Related U.S. Application Data

(63) Continuation of application No. PCT/EP2015/071902, filed on Sep. 23, 2015.

(30) Foreign Application Priority Data

Sep. 23, 2014 (EP) .................................. 14185958

(51) Int. Cl.
*B30B 11/08* (2006.01)
*B30B 11/00* (2006.01)
*G06F 13/42* (2006.01)
*H04L 12/40* (2006.01)

(52) U.S. Cl.
CPC ............ *B30B 11/005* (2013.01); *B30B 11/08* (2013.01); *G06F 13/4282* (2013.01); *H04L 12/40078* (2013.01)

(58) Field of Classification Search
CPC .... B30B 11/005; B30B 11/08; G06F 13/4282
See application file for complete search history.

(56) References Cited

U.S. PATENT DOCUMENTS

| | | | |
|---|---|---|---|
| 6,631,396 B2 | 10/2003 | Meyer et al. | |
| 7,014,443 B2 | 3/2006 | Hinzpeter et al. | |
| 7,647,131 B1* | 1/2010 | Sadowski | G05B 23/0297 700/108 |
| 7,648,388 B2 | 1/2010 | Kanazawa et al. | |
| 9,144,873 B2 | 9/2015 | Luedemann et al. | |

(Continued)

FOREIGN PATENT DOCUMENTS

| | | |
|---|---|---|
| DE | 20 2005 017 516 U1 | 1/2006 |
| DE | 10 2006 031 401 A1 | 1/2008 |
| GB | 2276476 A | 9/1994 |

OTHER PUBLICATIONS

English translation of International Search Report of the international searching authority dated Jan. 11, 2016 in International patent application PCT/EP2015/071902 on which the claim of priority is based.

*Primary Examiner* — Tim T Vo
*Assistant Examiner* — Harry Z Wang
(74) *Attorney, Agent, or Firm* — Walter Ottesen, P.A.

(57) ABSTRACT

The invention relates to a system and to a method for identifying a compression roller column in a tableting machine having a machine processor. The system includes a plug-in connection which includes a receiving socket and a plug. The plug has at least one embedded controller, and data can be exchanged between the machine processor of the tableting machine and the embedded controller of the plug via the one plug-in connection. The plug and the receiving socket are arranged on the tableting machine. The plug can be connected to the receiving socket.

13 Claims, 4 Drawing Sheets

(56) References Cited

U.S. PATENT DOCUMENTS

| | | | |
|---|---|---|---|
| 2003/0045170 A1* | 3/2003 | Ohkawa | H01R 31/065 |
| | | | 439/638 |
| 2006/0082009 A1* | 4/2006 | Quail | B22D 17/007 |
| | | | 264/40.1 |
| 2010/0038808 A1* | 2/2010 | Vogeleer | B30B 11/005 |
| | | | 264/40.4 |
| 2012/0165969 A1* | 6/2012 | Elsey | B29C 67/0059 |
| | | | 700/120 |
| 2014/0132720 A1 | 5/2014 | Rogers et al. | |
| 2014/0145362 A1 | 5/2014 | Kolbe | |
| 2014/0195036 A1* | 7/2014 | Ludemann | B30B 11/005 |
| | | | 700/175 |

* cited by examiner

SYSTEM AND METHOD FOR IDENTIFYING A COMPRESSION ROLLER COLUMN IN A TABLETING MACHINE

CROSS REFERENCE TO RELATED APPLICATIONS

This application is a continuation application of international patent application PCT/EP2015/071902, filed Sep. 23, 2015, designating the United States and claiming priority from European application 14 185 958.7, filed Sep. 23, 2014, and the entire content of both applications is incorporated herein by reference.

FIELD OF THE INVENTION

The invention relates to a system and to a method for identifying a compression roller column in a tableting machine having a machine processor, wherein the system includes a plug-in connection which includes a receiving socket and a plug, wherein the plug has at least one embedded controller, and data can be exchanged between the machine processor of the tableting machine and the embedded controller of the plug via the one plug-in connection, and the plug and the receiving socket are arranged on the tableting machine, wherein the plug can be connected to the receiving socket.

BACKGROUND OF THE INVENTION

In the prior art, tableting machines or rotary tablet presses are described, in which compression roller columns are used. Depending on the type, these compression roller columns can look exactly the same, and cannot be visually distinguished. Therefore, in the prior art, various methods and processes are described in order to be able to distinguish even compression roller columns that look the same on the outside but have different technical features. For example, compression roller columns can differ by different measuring pins, adjustment paths and displacement sensors which can record different forces. In the prior art, codings are described, with which compression roller columns are provided and with the help of which compression roller columns that look the same can be distinguished. These codings can be of mechanical or digital nature. For example, compression roller columns can be provided with self-explanatory or consecutive markings. In the case of consecutive marking, the information about the compression roller column must be printed on the column. The data could also be contained in a file that has to be consulted when the manner in which the compression roller is configured is to be verified.

For example, in DE 20 2005 017 516 U1, a rotary tableting machine is disclosed, in which individual subassemblies and/or individual parts of subassemblies of the tableting machine can be exchanged, wherein each subassembly or each individual part of a subassembly includes a uniquely identifiable transponder, which can be read via a transceiver unit. Such a transponder can be, for example, an RFID (radio-frequency identification) sensor, with which the subassembly or the individual parts of the subassembly are provided. Usually, electrical waves are transmitted between a transmitter and a receiver. The RFID technology accordingly is based on the use of electromagnetic induction. However, in the process, interfering signals or interference sinks can occur due to the ferromagnetic components of a tableting machine or of a rotary tablet press. Accordingly, it is ruled out that a transmitter and/or receiver can be placed at any desired site in the tableting machine or the rotary tablet press. Transmitter and receiver must be placed as close to one another as possible, so that the surrounding iron mass has as little influence as possible on the signal quality or functionality of the RFID sensor. Another disadvantage of the RFID technology is that its use is associated with high costs in comparison to other methods.

Due to the transmission of electromagnetic waves between transmitter and receiver, it is possible to transmit, for example, identification data of the compression roller column. As a result, the information concerning the pressure roller column is no longer located exclusively in the compression roller column, but also in an external system. Thus, such a system can be susceptible to misuse or tampering.

A monitoring, also based on the use of transponders, for the arrangement and operation of components or subassemblies of a tableting machine is disclosed in U.S. Pat. No. 7,014,443 B2, wherein, by means of a contact-free configuration of the communication between a write or read head and the transponders, a complex wiring of individual transducers, sensors or switches should be avoided. Such a complex wiring results when each component or each subassembly is connected individually to the write or read head.

In addition, it is possible to provide compression roller columns with bar codes (strip codes) or QR (quick response) codes. Here, it has been technologically challenging to connect the compression roller columns with these code types in such a way that the codes can be read without error at all times. Both the bar code technology and the QR code technology are based on strong optical contrast between a light colored, usually white, background, and the characteristic dark, in particular black, strips or patterns. The codes applied on the compression roller column are easily damaged or soiled, which impairs their functional capability. In addition, it is difficult to integrate the application of the code in the manufacturing process of the compression roller columns. Furthermore, the fastening to the compression roller column must be sufficiently durable so that the codes do not become detached from the compression roller column during the exchange, production or cleaning process. This applies particularly to wash-in-place machines.

A disadvantage of the coding of a compression roller column before it is built into the tableting machine is that the coding cannot contain all the characteristic features of the compression roller column. This pertains, for example, to the sensitivity of the measuring bridge, and, in particular, to data that change during the service life of the machine. In addition, the printing ink used to apply the coding to the compression column can peel off and conceivably find their way into the tablets to be manufactured. This is in violation of good manufacturing practices (GMP) and must be avoided at all costs.

In the case in which the coding is etched, the etching process must take place before the surface treatment of the compression roller column. Consequently, later changes can no longer be acquired.

In U.S. Pat. No. 9,144,873 B2, mechanical coding elements are disclosed, which are recesses and protrusions that unequivocally the position of a plurality of control cam elements on a cam support of a tablet press. A disadvantage of these mechanical coding elements is that the components that engage in one another have to be fabricated with high precision, which is particularly challenging technologically if the stresses that occur in the tablet press require the use of hardened materials. As a result, components can become distorted and have to be straightened, which affects the precision of a component.

In US 2014/0145362 A1, a stripper device of a tablet press with an identification and/or positioning unit and identification and/or positioning data is disclosed. Here, the stripper device includes a read and/or write unit, which is configured in order to communicate with the at least one identification and/or positioning unit, in order to read out the identification and/or positioning data from the at least one identification and/or positioning unit. It is proposed to carry out this communication wirelessly. Due to the wireless communication based on the transmission of electromagnetic waves, the disadvantages mentioned above in connection with the RFID technology can occur. In particular, the use of iron-containing and thus ferromagnetic constituents in a tablet press leads to interference and shielding effects in the signal transmission.

In US 2014/0195036 A1, a method is described for operating an installation for manufacturing tablets, wherein, in a storage and communication component which is arranged on the rotor packets, a data set adapted to the rotor type can be stored. It is known that the rotor type or the constituents thereof perform a rotation during the operation of the rotary press, and, therefore, primarily wireless communication means are considered for the use of rotatable constituents of the rotary press. However, if wired communication means are to be used on the rotor packets, this can have a disadvantageous effect on the manageability of the rotary press, and the likelihood of incorrect cabling exists.

SUMMARY OF THE INVENTION

It is an object of the invention to provide a system for identifying a compression roller column in a tableting machine, which does not have the deficiencies and disadvantages of the prior art. In particular, a system and a method for identifying compression roller columns should be provided in the form of non-rotating constituents of a tableting machine, wherein a complicated cabling and wiring of the components is avoided, and wherein the use of such communication means based on the transmission of electromagnetic waves is dispensed with, since such communication means, in connection with the large iron or steel masses, are highly susceptible to interference and characterized by a high energy consumption for the data transmission.

The object can, for example, be achieved via a system for identifying a compression roller column in a tableting machine, which is characterized in that the system includes a plug-in connection which includes a receiving socket and a plug. The plug has at least one embedded controller, and data can be exchanged between the machine processor of the tableting machine and the embedded controller of the plug via the one plug-in connection, and the plug and the receiving socket are arranged on the tableting machine, wherein the plug can be connected to the receiving socket.

It was entirely surprising that a system for identifying a compression roller column can be provided, which makes it possible to distinguish visually undistinguishable compression roller columns for the tableting machine. Here, a system according to the invention represents a particularly cost effective and easy to read solution. In addition, it was entirely surprising that it is possible to provide a system for identifying compression roller columns, in which the identification data of the compression roller column can be held within the compression roller column. When necessary, the reading out ensures that the correct compression roller is present, arranged at the correct site at the correct time. It was particularly surprising that, according to the invention, the identification of the pressure roller columns can be implemented with a single plug-in connection, so that a complicated cabling and wiring of different components and groups of components can be effectively avoided. Advantageously, this single plug-in connection enables, between embedded controller in the plug and the machine processor in the tableting machine, an exchange of data and/or information, wherein an "exchange", is preferably understood to mean a two-way transmission of data and/or information between embedded controller and machine processor.

Due to its preferably modular construction, the plug is also referred to preferably synonymously as plug system. The use of only one plug-in connection enables the selection of a plug having several surprising advantages: The selected plug or the selected plug system is used preferably, on the one hand, for the transmission of signals via the contacting. In addition, it can be preferable to introduce, in the plug, highly sensitive low-current signal lines which, for example, are needed for the communication with the embedded controller, that is, the processor and/or memory chip. On the other hand, it can be preferable to provide surprisingly robust high-current contacts, for the current transmission of the motors, in the plug.

Moreover, it is preferable that, in another module of the plug, additional plug contacts are installed, which are preferably needed for the transmission of the displacement sensor signals.

In a preferred embodiment of the invention, the plug and the receiving sockets include modules that correspond to one another. The preferably modular construction of the plug or of the plug system surprisingly enables the achievement of a plurality of aims which, in the prior art, are attained by using several individual plugs. It was particularly surprising that, for example, highly sensitive signal lines, high-current lines and the signal lines for displacement sensors, the control and energy transmission of the motors can be integrated in a plug that is preferably of modular construction.

It is preferable that the plug system includes a logic circuit board, a processor, a memory chip, and other electronic components, wherein it is a deviation from the prior art to integrate these components in one plug. It was, in particular, completely surprising that the mentioned components do not have to be accommodated, as described in the prior art, in their own separate housing.

Surprisingly, due to a configuration of the system according to the invention, different media can be supplied using only one feed of the compression roller column, wherefore, in conventional tableting machines, a plurality of plug-in connections is needed, which can lead to the known cabling problems.

In a preferred embodiment of the invention, the embedded controller includes a processor. In the sense of this invention, a processor is preferably understood to mean a machine and/or an electronic circuit which controls other machines and/or electrical circuits, in particular via commands. For example, for this purpose, processes and/or algorithms can be used, which draw on methods from the field of data processing.

In another preferred embodiment of the invention, the processor has at least one input for reading in the data and at least one output for outputting the data. As a result, advantageously, the reading in and the reading out of data are enabled, so that the embedded controller can also output data that has been transmitted to it from outside. In the sense of the present invention, this capability is preferably referred to as gateway property of the embedded controller, wherein the embedded controller is preferably moreover capable of processing data in the sense that data, for example, can be changed and/or forwarded.

It is preferable that the plug includes a processor, wherein the processor of the plug communicates with the machine processor of the tableting machine. This enables a rapid and reliable transmission of the data with low susceptibility to error. In the sense of the invention, a machine processor is preferably a central processing unit of the tableting machine, via which commands and/or software program products can be executed. In the sense of the invention it is particularly advantageous that the processor, which preferably forms the embedded controller and is arranged in the plug of the plug-in connection according to the invention, is not the machine processor of the tableting machine. On the contrary, it is preferable for them to be two different system components that are independent of one another and that are present arranged at different sites of the system.

In another preferred configuration of the invention, data are evaluated by the processor which is located in the plug. It is preferable that the processor identifies the individual participants of the system and reads the data in and/or out. In addition, the data for the higher-order plane are aggregated, for example, via a wrap-upper. Advantageously, the number of the participants of the system is nearly unlimited. A method according to the invention is advantageously suitable not only for coding compression roller columns, but can also be used for the coding of other constituents of the tableting machine.

In the sense of the present invention, the term "wrap-upper" preferably denotes a system which functions as a collecting site or an aggregating unit. Preferably, the wrap-upper aggregates the preferably connected data of the individual participants of the system and makes it available, for example, via a bus system, to a central data processing system. In the sense of the invention, the wrap-upper can also be referred to as "data collector", for example. It is preferable that the wrap-upper can be placed centrally, that is, for example, in the vicinity of the individual tableting machine areas. Advantageously, this makes it possible for the participants to be wired in any topology, that is, for example, in the form of a ring and/or star, on the wrap-upper, and connected from there with only one system to the main computer. As a result, time consuming cabling is reduced to a surprising extent. Moreover, it was completely surprising that, due to the preferred use of a wrap-upper, a first logic operation site, which preferably aggregates data, can also be provided.

However, in another preferred embodiment of the invention, it can be preferable that the embedded controller includes a processor and/or a memory chip. A memory chip in the sense of the present invention is preferably a circuit, which can preferably include a plurality of memory cells and can be integrated. A memory chip, in the sense of the invention, is used in particular for storing data. It is preferable that the memory chip is present in the plug on the compression roller column. As a result, space is saved, and a space- and cost-saving configuration of the tableting machine is made possible.

In another preferred embodiment of the invention, the memory chip of the plug stores and/or uses data, selected in particular from the group including identification and characterization data of a compression roller column or other components of the tableting machine, namely rotor, filling or dosing cams, tablet stripper and/or feed shoe, data on the sensitivity of the measurement sites, calibration data, data for characterizing the compression roller column, data on the number and type of the measurement sites, adjustment paths, displacement sensors and sensors.

In another preferred embodiment of the invention, the data stored on the memory chip is in particular selected from a group including identification data of the compression roller column or other components of the tableting machine, data on the sensitivity of the measurement sites, calibration data, data for the characterization of the compression roller station, data on the number and type of the measurement sites, adjustment paths, displacement sensors and sensors.

Other components of the tableting machine can preferably be rotor, filling or dosing cams, tableting stripper and/or feed shoe. The data which characterizes the compression roller column, for example, is read out and, in the case of changes, written again into the memory chip. A storage on a computer is advantageously not needed. It was entirely surprising that, via the method according to the invention, an identification of visually identical compression roller columns can be achieved by use of the mentioned data.

In another preferred embodiment of the invention, the plug-in connection includes a wrap-upper for aggregating and/or preparing the data. Furthermore, it is preferable if the data is transmitted from the compression roller column or the other participants of the system according to the invention to the wrap-upper. It is preferable that the wrap-upper aggregates and/or prepares the data so that the data, in particular in the machine processor of the tableting machine, can be further processed and/or evaluated and/or output on a display.

In another preferred embodiment of the invention, the wrap-upper is located outside of the compression roller column and/or in the tableting machine. As a result, it is particularly easily accessible and it can be maintained, cleaned or exchanged particularly simply and rapidly.

It is preferable if the system according to the invention is a component of a modular-construction tableting machine. In such tableting machines, the compression roller stations can advantageously be placed at different sites depending on the machine configuration. Preferably, these machine configurations include the manufacture of multilayer (single layer, two-layer, three-layer) and coated core tablets.

Multilayer tablets, in the sense of the invention, are preferably tablets in which several layers of different pressing material are pressed to form a tablet. Preferably, these different pressing materials contain different active ingredients, which, due to their chemical and/or mechanical constitution and/or due to different uptake behaviors, have to be made available in different layers within a tablet, optionally with a different support material. Advantageously, all the layers are made of different pressing materials. However, it can also be preferable that two or more layers are made of the same material and a different intermediate layer is pressed between two identical layers.

Coated core tablets, in the sense of the invention, are preferably tablets in which an inlay is pressed in the interior of a tablet. Such an inlay is preferably also referred to as tablet core. It is preferable, if a chip and/or a film is used as information support and/or the core is made of a carrier material and/or active ingredient different from the base material of the tablet.

The compression roller column position is preferably stopped and firmly held via a bolt. Moreover, it is preferable that, when the bolt is loosened and with exposure to pressurized air, an air cushion forms, via which the compression roller column can be placed at another site. The compression roller columns can advantageously be configured differently for different tasks. Therefore, there is a need to detect the configuration and design of the compression column, which can be ensured surprisingly simply and reliably by the system according to the invention.

The motors for the upper and lower compression roller adjustment preferably contain the position determination systems for the positioning of the compression rollers with respect to the die table. Advantageously, the upper and the lower compression roller bolts can both be instrumented in order to acquire the pressing force needed for the deformation of the tablet. The position of the upper compression roller is preferably set by an immersion depth motor, and the position of the lower compression roller is preferably set by a band height motor.

It is preferable that, via the immersion depth motor, the immersion depth of the upper press punch in the die can be set. Using the lower adjustment drive, preferably the band height of the tablet to be generated is regulated. In the die of a die plate, upper and lower punches of a rotary press preferably work together in such a manner that a tablet is pressed from the powder material to be pressed, which is located between the punches. The lower side of the upper punch and the upper side of the lower punch are here usually shaped so that, between the punches, a hollow cavity exists, the shape of which corresponds substantially to the shape of the tablet. Here, the upper and lower punches are preferably formed so that the upper and lower punches do not come in contact during the compression process. Due to the high pressing forces, the compression tools could be damaged as a result. Instead, it is provided that the powder material to be pressed is located between the punches.

Usually, tablets have a greater thickness in a central area than on the margins. This thickness can decrease toward the margins, wherein it does not assume the value of zero, which would be equivalent to an unwanted contacting of the upper and lower punches. On their margins, tablets thus preferably have a thickness which is preferably referred to as band height, or tablet height, respectively. This band height or tablet height, respectively, is set in a preferred embodiment of the invention via the band height motor.

Another advantage of the present invention is that, due to the use of a plug-in connection, in contrast to the RFID technology, no write and read head is needed. Rather, only one readout unit for several participants is needed. This allows a cost-efficient production of the system according to the invention, and the saving of resources. In addition, the simplicity of the system leads to a reduced susceptibility of the compression roller column coding in comparison to the coding systems known in the prior art.

In addition, the coding system of the present application is accommodated in the existing plug housing. A protective infrastructure of the system beyond this is advantageously not needed. The present invention thus combines technical advantages, compared to conventional coding types, with the simple, cost effective integration in already existing components of the tableting machine, as a result of which the volume utilization thereof is increased, and there is a saving of space and transport costs. This is of particular significance in the case of tablet presses, since many components have to be accommodated within the press.

Moreover, the integration of the coding device in the plug housing ensures increased protection against data tampering. Unlike in the case of data transmission by electromagnetic waves, in the present case, it is necessary to tamper with or destroy, respectively, the infrastructure if data is to be tampered with intentionally. As a result, such tampering can be detected more easily and corrected. In addition, the increased risk of discovery per se has a deterrent action. The tamper-proof configuration corresponds advantageously to the requirements of the US Food and Drug Administration (FDA) of the U.S. Department of Health and Human Services.

In another preferred embodiment, the invention relates to a system in which a memory chip stores and uses data that is selected particularly from the group including identification data of a compression roller column or other components of the tableting machine, data on the sensitivity of the measurement site, calibration data, data for the characterization of the compression roller station, and data on the number and the type of measurement sites, data on the adjustment paths, data of the displacement sensors and/or sensors used, such as, for example, type and configuration. These other components of the tableting machine include rotor, filling or dosing cams, tablet stripper and/or feed shoe. As a result, in the memory chip, advantageously the data via which the visually identical compression roller columns can be distinguished is stored and used, respectively the data which is contained in a recipe and used advantageously for identifying the compression roller columns is stored and used.

The disadvantage of the RFID technology is that hardly any additional features can be implemented. The flexibility is limited to the selection of the memory size and to the determination of whether data should be readable and/or writable. However, by using the system according to the invention it is surprisingly possible to store functions that relate to the logic and that are not triggered by the machine processor of the tableting machine control, but which are processed directly on site. This is particularly advantageous when rapid processes are to be carried out. An additional advantage of the system according to the invention is that it is an open identification system that can be configurable as desired, and that can be expanded rapidly and in an uncomplicated manner in order to add further features. For example, in this manner, the change of a history can be stored. Advantageously, the system according to the invention enables the setup of any data and data structures in an unlimited manner, in contrast to RFID technology. The system is open and can advantageously also be used for the coding of other components of a tableting machine.

Furthermore, it is preferable that the plug is accommodated by the receiving socket of the tableting machine. It was completely surprising that the aim of the invention can be attained via a single plug-in connection including a plug according to the invention and a receiving socket. This represents, in particular, a deviation from the prior art, in which it was assumed that each component has to be provided individually, for example, with a transponder. In this manner, the interface between the compression roller column and the tableting machine is a predetermined interface at which the compression roller column can be advantageously separated from the tableting machine and/or connected thereto.

In another preferred embodiment of the invention, the plug and the receiving socket include mutually corresponding modules. In the sense of the invention, the plug and the receiving socket are preferably referred to as having a modular structure. For example, the variable plug-socket system provided according to the invention can advantageously be selected so that the plug includes a connection for different media. As a result, for example, it is possible to bring about the supply of current as well as pressurized air via the same plug system. It is particularly preferable if the modules include, for example, signal lines, high-current contacts, or data transmission means. In the sense of the invention, the term corresponding is preferably understood to mean that the modules of the plug advantageously interact with the modules of the receiving socket in such a manner that a connection is established between the plug and the receiving socket, which withstands the usual stresses during the operation of a tableting machine. It is particularly preferable if the outer shape of the modules, particularly the shape of the outer form of the modules, is adjusted to one another. Advantageously, the modular-type configuration of the plug and of the receiving socket enables a high degree of user friendliness as well as great adaptability to the needs of different users of the tableting machine.

The flexible system advantageously fulfills numerous electrical requirements. This includes the presence of many contacts in a small space, the shielding against high-frequency radiation, the presence of an interface plug for, for example, Ethernet and BNC (coaxial plug connector for high-frequency uses), the presence of high-current contacts, the solution of special electromagnetic applications, for example, special BUS plugs or USB connections, as well as the installation of individual circuit boards. A BUS (binary unit system) is a bidirectional data transmission system for transmitting data between multiple participants, in which the individual participants do not participate in the data transmission between the other participants. A USB connection (universal bus system) is a BUS system for connecting a computer to external apparatuses. Advantageously, the BUS system works serially, wherein individual portions of a data packet are transmitted sequentially. As a result, a high transmission rate is achieved. The usability of the listed connections leads to a highly universal applicability of the system according to the invention.

In a further aspect, the invention relates to a method for identifying a compression roller column via a tableting machine having a machine processor, wherein the method includes the following steps:

a) provision of a plug-in connection having a receiving socket and a plug, wherein the plug has at least one embedded controller;

b) storing of data on the embedded controller of the plug, wherein the data is selected in particular from the group including identification and characterization data of a compression roller column or other components of the tableting machine, namely rotor, filling and dosing cams, tablet stripper and/or feed shoe, data on the sensitivity of the measurement sites, calibration data, data for the characterization of the compression roller column, data on the number and type of the measurement sites, adjustment paths, displacement sensors and sensors;

c) storing of comparison data on the machine processor of the tableting machine and/or on a diagnostic apparatus, wherein the comparison data on the machine processor of the tableting machine correspond to the data stored on the embedded controller of the plug;

d) exchanging of data between the machine processor of the tableting machine and the embedded controller of the plug via the one plug-in connection;

e) identification of the compression roller column of the tableting machine based on a comparison of the data of the embedded controller of the plug with the comparison data of the machine processor of the tableting machine and/or of the diagnostic apparatus.

Advantageously, the method according to the invention includes the storing of data on the embedded controller of the plug. In the sense of the invention, this is understood to mean, in particular, the storing of data on a processor or on a processor and/or a storage memory chip. It is preferable if the data stored on the embedded controller of the plug is selected from the group including identification and characterization data of a compression roll column or other components of the tableting machine, namely rotor, filling or dosing cams, tablet stripper and/or feed shoe, data on the sensitivity of the measurement sites, calibration data, data for the characterization of the compression roller column, data on the number and type of the measurement sites, adjustment paths, displacement sensors and sensors.

Furthermore, it is preferably provided that comparison data is stored on the machine processor of the tableting machine and/or on diagnostic apparatus. In the sense of the invention, comparison data is data that can be stored on the machine processor of the tableting machine and/or on a diagnostic apparatus, and that enables a comparison of the data stored on the embedded controller of the plug. This comparison is used, for example, to establish whether the compression roller column type used is suitable for the manufacturing of the tablet type provided for, and/or whether the compression roller column is correctly arranged, fastened and/or connected in the tableting machine. The data concerning the correct assembly and the question of which compression roller column types are suitable for the manufacturing of which tablet types can be available, for example, in the form of construction plans and/or recipes, and, in the sense of the present invention, it is preferably referred to as comparison data.

In the sense of the invention, the term "diagnostic apparatus" denotes a device via which a preferably direct connection can be set up between the embedded controller and the tableting machine, without the need for "wrap-upper" and/or a main computer of the tableting machine with a computer program product for the communication and representation of the data. It is preferable that, via this connection, in particular, data can be read out. For example, this data readout process can advantageously occur when the compression roller column is in repair and/or maintenance outside of the tableting machine, and the infrastructure thereof is not available. Surprisingly, in this manner, the system according to the invention can also be parameterized, that is, it can be supplied with new and/or extended data. It is preferable to use the diagnostic apparatus for the verification of the functions of the compression roller column or for the verification as to whether errors might be present that would not have been detected without the system according to the invention in the tableting machine. In particular, the use of a diagnostic apparatus enables a surprisingly rapid and efficient repair, maintenance and/or initialization of the compression roller column of a tableting machine.

Moreover, it is preferable that the comparison data on the machine processor of the tableting machine correspond to data that is stored on the embedded controller of the plug. In the sense of the invention, the term "correspond" preferably is understood to mean that there is agreement between the data present on the embedded controller of the plug and the comparison data existing in the machine processor of the tableting machine, wherein an agreement of the data, for example, can lead to operational clearance for the manufacturing of tablets by the system according to the invention.

It is particularly preferable that the data comparison using the data exchange between the machine processor of the tableting machine and the embedded controller of the plug occurs via a plug-in connection. In this context, it is particularly preferable that the data transmission occurs not on the basis of electromagnetic radiation, but by contact or wire. Advantageously, the identification of the compression roller column of the tabletting machine occurs by comparison of the data of the embedded controller of the plug with the comparison data of the machine processor of the tabletting machine and/or of the diagnostic apparatus.

The method according to the invention represents a solution that is surprisingly tamper-proof, and, in particular, it has been shown to be clearly more secure in tests than the USB interfaces with USB protocol known in the prior art. A disadvantage of the use of the USB technology is that it can be used only if each participant has available a separate USB port, that is, an interface. Advantageously, the storage processor media used in the identification system according to the invention are connected via a common bus system. In addition, the method according to the invention surprisingly enables a port assignment.

In another preferred configuration of the invention, the data on the embedded controller of the plug and the comparison data on the machine processor of the tabletting machine and/or on the diagnostic apparatus can be changed. For some applications, it can be preferable to transmit, compare changed data and/or store it on the memory chip and/or the processor. This is particularly advantageous in the case of non-static data that changes during the service life of the compression column or of another component of the tabletting machine.

Moreover, it is preferable if the data is transmitted from the compression roller column and/or the other participants to a wrap-upper located outside of the compression roller column and/or within the tabletting machine. This wrap-upper advantageously aggregates the data received and prepares it so that it can be further processed, evaluated in the machine processor of the tabletting machine and/or output to a display. However, it can also be preferable that the wrap-upper is part of a machine control.

In another preferred configuration of the invention, the data exchanged via a plug connection is aggregated by a wrap-upper and/or processed. This is particularly advantageous, since the method according to the invention thereby can be run more efficiently, and effective data management can be ensured. In the sense of the invention, the term "data management" is understood to mean that the amount of data to be processed is verified in order to determine whether individual subquantities of the data or all the data to be potentially processed is already stored on a storage medium, for example, the memory chip, the processor and/or the machine processor. The user of the system according to the invention is in this way protected particularly effectively against unintended writing over and/or destroying of data. In addition, the data management in the sense of the invention advantageously enables an establishment as to whether data sets are, for example, valid or expired.

In the sense of the invention, it is particularly preferable that the data of the embedded controller of the plug is transmitted for the aggregating and/or preparing to the wrap-upper before it is forwarded to the machine processor of the tabletting machine. Tests have shown that this way of proceeding represents a substantial contribution to efficient data management in the sense of the present invention.

In another preferred embodiment of the invention, the machine processor of the tabletting machine communicates via a USB protocol with the embedded controller of the plug. The use of USB protocols has been shown to be particularly user friendly, wherein the use of USB protocols is widespread, ensuring high user acceptance, and advantageously high compatibility of the data formats and communication means.

In another preferred embodiment of the invention, the machine processor of the tabletting machine communicates via a communication system with the embedded controller of the plug, which is selected in particular from the group including Ethernet, Profibus, field bus, CAN bus. With the use of a BUS system it is ensured that, using one readout system, several compression roller columns can be identified. Each compression roller column is unique in terms of its characteristic identification data. Even if there are several compression roller columns in a tabletting machine, only one readout system is needed. Using this single readout system, multiple pieces of information can be read out at the same time.

Advantageously, the method according to the invention uses an open coding system, in which memory and processor can be adapted to one another. It is preferable that functions are stored that do not have to be processed by the control computer. Thereby, a rapid and individual processing of the task is possible. It is advantageous that functions can be activated which are carried out automatically based on certain temporal and/or content-related specifications.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
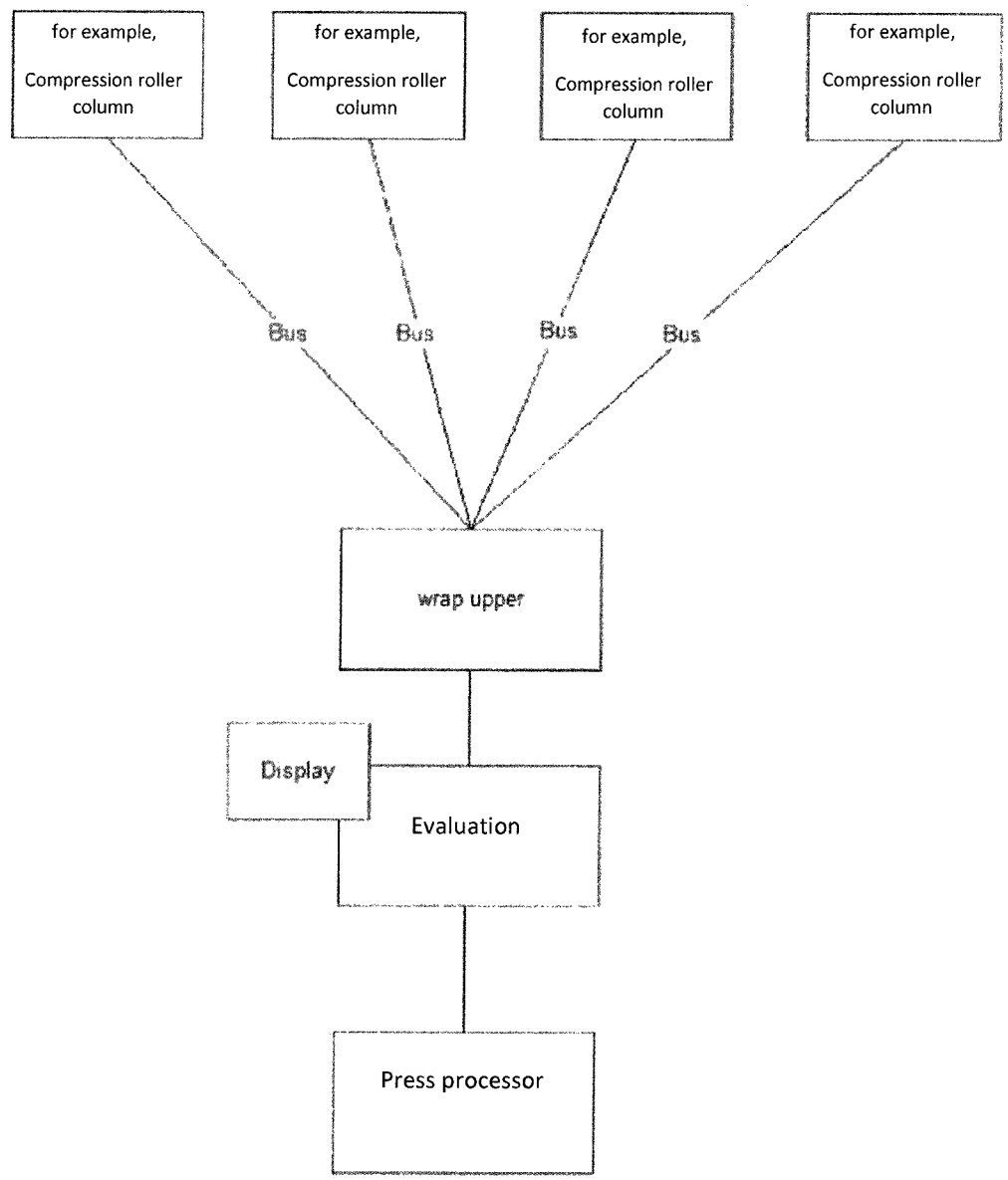
FIG. 1 is a diagrammatic representation of the method according to the invention.

FIG. 1 shows a diagrammatic representation of a method according to the invention. Accordingly, the invention relates to a method for identifying a compression roller column via a tabletting machine. In the process, using the system according to the invention for identifying a compression roller column 12, data is stored on a memory chip. This memory chip is located in a plug 24 which, together with a receiving socket, forms the system according to the invention. The modular-construction plug 24 can also include a processor. The data is identification data of a compression roller column 12, identification data of other components of the tabletting machine, namely rotor, filling or dosing cams, tablet stripper and/or feed shoe, data on the sensitivity of the measurement sites, calibration data, data characterizing the compression roller station, data on the number and type of the measurement sites, adjustment paths and displacement sensors. It is provided that data can be taken from both the compression roller column 12 and other components of the tabletting machine. If, with regard to this data, changes occur, then this data that has been changed can optionally be transmitted from the compression roller column 12 or other components of the tabletting machine to the memory chip and stored there. This leads to a particularly flexible usability of the method according to the invention.

The data is transmitted from the compression roller column 12 to a wrap-upper via a BUS system. The wrap-upper is located outside of the compression roller column 12 in the tabletting machine. The wrap-upper aggregates the data and prepares it. The data is used by the tabletting machine in order to identify the compression roller columns 12. This occurs by the reading of the memory chip by the tableting machine and/or a diagnostic apparatus. The result of the evaluation can be output via a display. It can also be preferable that the data is evaluated by a processor located in the modular-construction plug 24 and/or is output to the main monitor of the tableting machine.

The tableting machine includes a machine processor which communicates via a USB protocol with the plug 24. It is also preferable that the machine processor communicates via another communication system with the plug 24. One can consider using communication systems such as Ethernet, Profibus, field bus and/or CAN bus. In the sense of this invention, the machine processor is also referred to as press processor.

Figure 2:
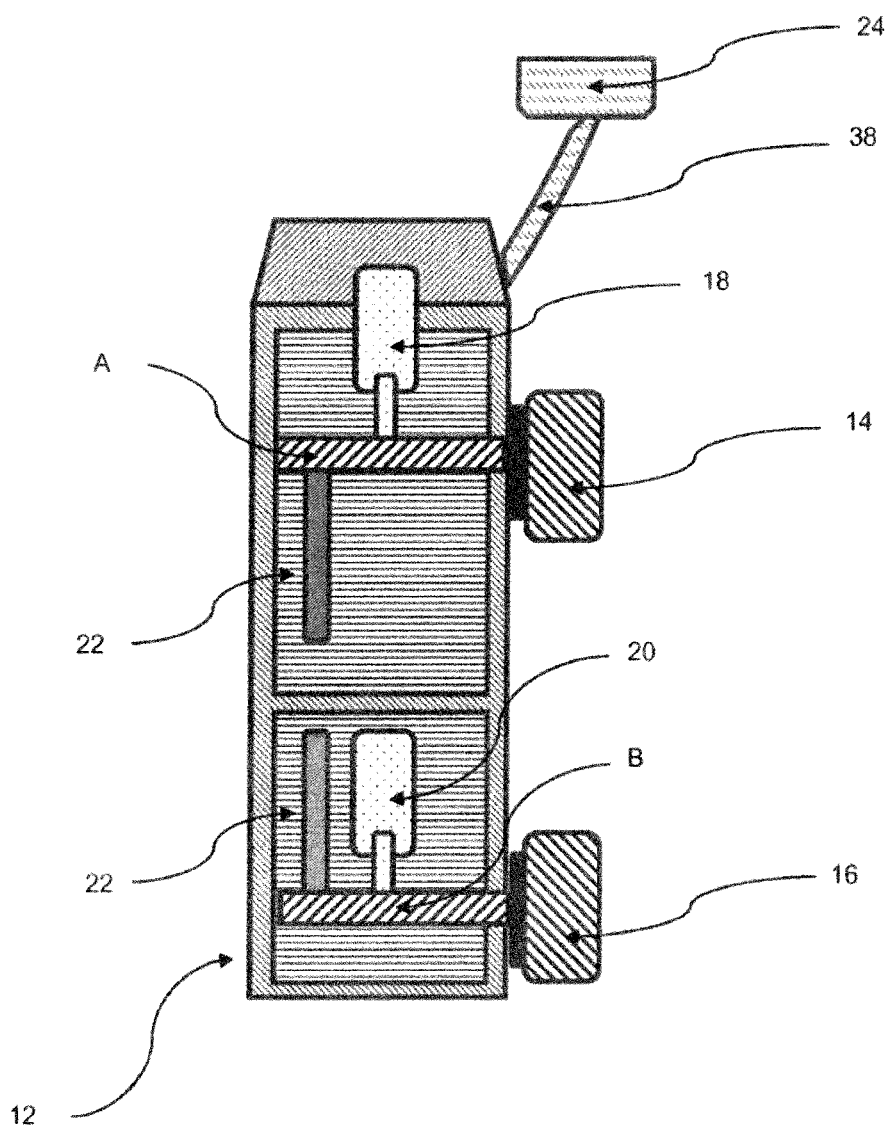
FIG. 2 is a diagrammatic side view of a compression roller column.

FIG. 2 shows a diagrammatic side view of a compression roller column. The tableting machine includes an upper compression roller 14 and a lower compression roller 16. The position of the upper compression roller 14 can be varied via an immersion depth motor 18. Thereby, it is possible to regulate the depth to which the upper press punches penetrate into the opening of a die plate, in order to compress the powdered tablet material. For controlling the position of the upper compression roller 14, the tableting machine includes displacement sensors 22. These displacement sensors 22 can be configured, for example, as inductive displacement sensors. The position of the lower compression roller 16 is regulated by a band height motor 20. Here too, a displacement sensor 22 is used. A band represents the central area of a tablet in side view needed for manufacturing so that the compression tools do not to come in contact with one another during the compression process. This would represent a considerable damage potential for the compression tools. The pressing forces are acquired by the strain gauges A and B, which are applied to the axles of the compression rollers 14, 16.

When the compression rollers 14, 16 are arranged not on a compression roller column 12 but on separate components of the tableting machine, noise pollution can occur. Furthermore, the two compression rollers 14, 16 tend to move apart from one another during the tablet manufacturing, that is, the upper compression roller 14 tends to move upward, while the lower compression roller 16 tends to move downward. This results in the application of enormous forces on the entire tableting machine and its housing. These problems are remedied by the use of one or more compression roller columns 12, since these forces can be dissipated via the compression roller column 12 and the tableting machine table on which the tableting machine 12 is located.

Conventionally, for different tablets, tablet shapes and tablet types (single-layer, double-layer, multilayer or inlay core tablets), different compression roller columns 12 are used. In general, they do not differ externally from one another, but they differ by their inner construction and the compression rollers 14, 16 used, as well as by the force transmission. In order to be able to identify these outwardly indistinguishable compression roller columns 12, and in order to ensure the correct installation of a compression roller column 12 at the correct site of the tableting machine, it is necessary to provide means enabling one to distinguish different compression roller columns 12 from one another reliably and easily. This technical requirement is achieved by the system according to the invention and by the method according to the invention.

Figure 3:
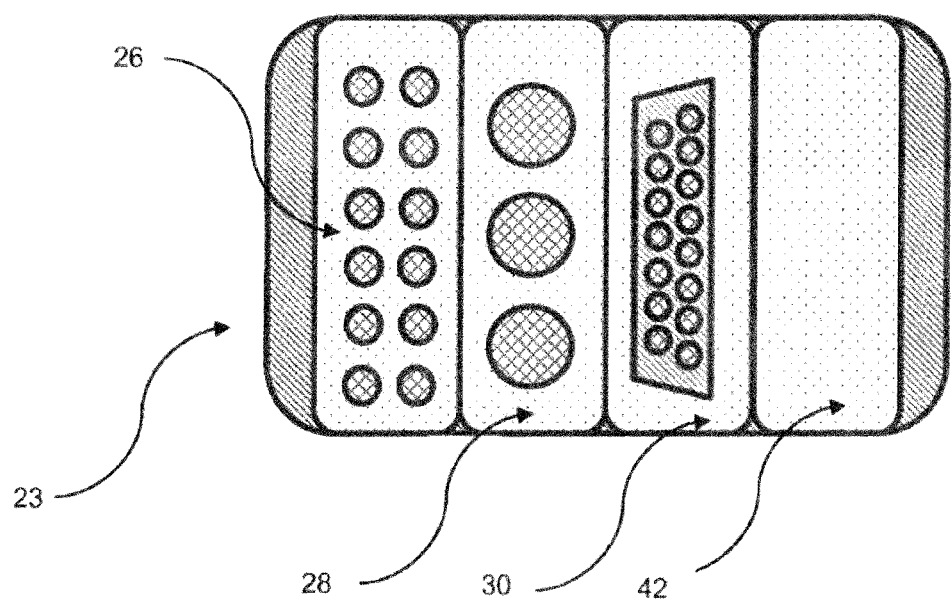
FIG. 3 is a top view of the socket with an representation of four freely configurable modules; and, FIG. 4 is a side view of an example of an equipped plug.

FIG. 3 shows a top view of a socket 23 as a constituent of the system according to the invention with a representation of four freely configurable modules 26, 28, 30, 42. The modular-type construction of the socket 23 can be seen clearly in FIG. 3. FIG. 3 also shows an equipping of a socket 23. For example, a typical module for signal lines 26, a module for high-current contacts 28, and a module for data transmission 30 are located in this socket 23. The module for signal lines 26 can be displacement sensors or strain gauges, for example. The module for high-current contacts 28 is configured, for example, for controlling a motor. In the context of this invention, the modular-type socket 23 is not limited to the embodiment example of FIG. 3, but rather it can include additional modules which can be arranged in the manner represented or in any other manner.

Figure 4:
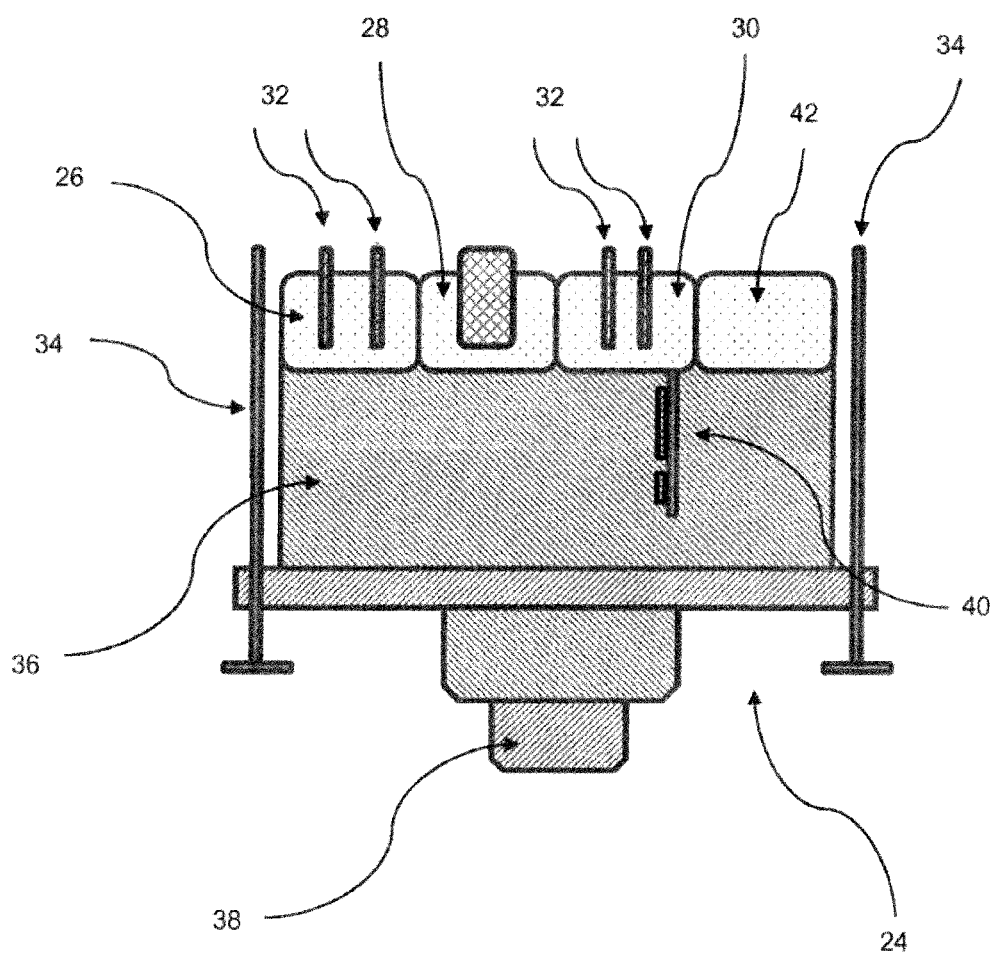

FIG. 4 shows a side view of an example of an equipped plug 24. For example, one can see four modules 26, 28, 30, 42. The module for signal lines 26 and the module for data transmission 30 are provided with contacts 32. These contacts are used for establishing contact between the modular-construction plug 24 and the receiving socket. The module for the data transmission 30 moreover includes a circuit board 40. In order to ensure a reliable hold in the receiving socket, the modular-construction plug 24 includes fastening screws 34. By means of these fastening screws, the modular-construction plug 24 present in the receiving socket can additionally be firmly screwed to the tableting machine. The connection to the compression roller column is established via a line or a tube 38. Moreover, the modular-construction plug 24 includes a cable routing space 36.

It is understood that the foregoing description is that of the preferred embodiments of the invention and that various changes and modifications may be made thereto without departing from the spirit and scope of the invention as defined in the appended claims.

LIST OF REFERENCE NUMERALS

12 Compression roller column
14 Upper compression roller
16 Lower compression roller
18 Immersion depth motor
20 Band height motor
22 Displacement sensor for compression rollers
A Upper compression roller axle with applied strain gauges
B Lower compression roller with applied strain gauges
23 Modular-construction socket with module examples
24 Modular-construction plug with module examples
26 Typical module for signal lines (for example, displacement sensor or strain gauge)
28 Module for high-current contacts (for example, for the control of a motor)
30 Module for data transmission
32 Contacts
34 Fastening screw
36 Cable routing space
38 Line or tube for compression roller column
40 Circuit board
42 Empty module

What is claimed is:

1. A tableting machine comprising at least one compression roller column, the tableting machine being configured to allow for an exchange or differential placement of said at least one compression roller column in dependence upon a desired machine configuration, the tableting machine further comprising a system for identifying a compression roller column in the tableting machine having a machine processor, the system comprising: a plug-in connection having a receiving socket and a plug; said plug having at least one embedded controller; said embedded controller being configured to exchange data with the machine processor of the tabletting machine via said plug-in connection; said plug and said receiving socket being arranged on the tabletting machine; and, said plug being configured to connect to said receiving socket, wherein said embedded controller includes a memory chip for storing and using data and a processor for evaluating the data; wherein said memory chip of said plug is configured to store and use data comprising identification and characterization data of said at least one compression roller column and wherein the data is evaluated by said processor in said plug to identify whether a correct one of said at least one compression roller columns is present at a correct site; and, wherein said plug and said receiving socket comprise a plurality of modules including a first module for data transmission configured to transmit said data on said at least one compression roller column, a second module for signaling lines configured to transmit signals regarding a displacement sensor or strain gauge and a third module for high-current contacts for controlling a motor of said at least one compression roller column.

2. The tabletting machine of claim 1, wherein said plug-in connection further includes a wrap-upper for at least one of aggregating the data and preparing the data.

3. The tabletting machine of claim 2, wherein said wrap-upper is disposed outside the compression roller column and/or in the tabletting machine.

4. The tabletting machine of claim 1, wherein: said plug includes the first module; said receiving socket includes the second module; and, said first module and said second module correspond to one another.

5. The tabletting machine of claim 1, wherein said processor has at least one input configured to read in said data and at least one output configured to output said data.

6. A method for identifying a compression roller column in a tabletting machine, the tabletting machine having a machine processor and comprising at least one compression roller column, the tabletting machine being configured to allow for an exchange or differential placement of the at least one compression roller column in dependence upon a desired machine configuration, the method comprising the steps of:
 a) providing a plug-in connection including a receiving socket and a plug, wherein the plug has at least one embedded controller, wherein the embedded controller includes a memory chip for storing and using data and a processor for evaluating the data, and wherein the plug and the receiving socket comprise modules including a first module for data transmission configured to transmit the data on the at least one compression roller column, a second module for signaling lines configured to transmit signals regarding a displacement sensor or strain gauge and a third module for high-current contacts for controlling a motor of the at least one compression roller column;
 b) storing data on the embedded controller of the plug, wherein the data includes identification and characterization data of a compression roller column;
 c) storing comparison data on at least one of the machine processor of the tabletting machine and a diagnostic apparatus, wherein the comparison data on the machine processor of the tabletting machine correspond to the data stored on the embedded controller of the plug;
 d) exchanging of data between the machine processor of the tabletting machine and the embedded controller of the plug via the one plug-in connection; and,
 e) identifying the compression roller column of the tabletting machine based on a comparison of the data of the embedded controller of the plug with the comparison data of the machine processor of at least one of the tabletting machine and of the diagnostic apparatus, wherein the data is evaluated by the processor in the plug to identify whether a correct one of the at least one compression roller is present at a correct site.

7. The method of claim 6, wherein the data on the embedded controller of the plug and the comparison data on at least one of the machine processor of the tabletting machine and the diagnostic apparatus can be changed.

8. The method of claim 6 further comprising the step of at least one of aggregating and processing the data exchanged via the one plug-in connection with a wrap-upper.

9. The method of claim 8 further comprising the step of transmitting the data of the embedded controller of the plug for at least one of aggregating and preparing to the wrap-upper before it is forwarded to the machine processor of the tabletting machine.

10. The method of claim 6, wherein the machine processor of the tabletting machine communicates via USB protocol with the embedded controller of the plug.

11. The method of claim 6, wherein the machine processor of the tabletting machine communicates with the embedded controller of the plug via a communication system.

12. The method of claim 11, wherein the communication system is selected from a group including ethernet, profibus, field bus and CAN bus.

13. A tabletting machine comprising:
 a first compression roller column;
 a motor for said first compression roller column;
 the tabletting machine being configured to allow for an exchange or differential placement of said first compression roller column and a further compression roller column in dependence upon a desired configuration of the tabletting machine;
 a machine processor;
 a system for identifying said first compression roller column in the tabletting machine;
 said system including a plug-in connection having a receiving socket and a plug;
 said plug having an embedded controller;
 said embedded controller being configured to exchange data with said machine processor via said plug-in connection;
 said plug and said receiving socket being arranged on the tabletting machine;
 said plug being configured to connect to said receiving socket;
 said embedded controller including a computer readable storage medium and a controller processor;
 said computer readable storage medium being configured to store data, wherein the data includes identification and characterization data of said first compression roller column;
 said controller processor being configured to evaluate the data so as to identify whether said first compression roller column is present at a correct site; and,
 said plug and said receiving socket having a plurality of modules including a first module for data transmission configured to transmit said data on said first compression roller column, a second module for signaling lines configured to transmit signals regarding at least one of displacement sensor and strain gauge and a third module for high-current contacts for controlling said motor for said first compression roller column.

\* \* \* \* \*